United States Patent Office 3,527,746
Patented Sept. 8, 1970

3,527,746
MONOAZO HETEROCYCLIC CONTAINING
TRIAZINE DYESTUFFS
Luigi Canonica, Milan, Argento Crotti, Cogliate, Milan, and Fabrizio Merlo, Turin, Italy, assignors to Aziende Colori Nazionali Affini, ACNA, S.p.A., Milan, Italy
No Drawing. Filed June 30, 1965, Ser. No. 468,587
Claims priority, application Italy, July 2, 1964, 14,367/64
Int. Cl. C09b 29/36; D06p 1/02
U.S. Cl. 260—153                                6 Claims

ABSTRACT OF THE DISCLOSURE

Triazine mono- and disazo dyestuffs suitable for the dyeing of modified polypropylene.

The present invention relates to a new class of disperse triazine dyestuffs particularly suitable for dyeing modified polypropylene. The present invention further relates to a process for dyeing modified polypropylene (obtained by the extrusion and spinning of a mixture of polypropylene and a basic organic substance) with said triazine dyestuffs.

The difficulties encountered in dyeing polypropylene fiber are well known. Thus, polypropylene consists solely of carbon and hydrogen atoms, and does not possess atoms, atom groups, or radical groups that, because of their reactivity or polarity, are apt to form chemical bonds with the various classes of dyestuffs.

Characteristics for a satisfactory dyeing generally require that the dyeing exhibit a suitable intensity, good leveling, and also a good resistance to alkaline washing, to detergents, to drycleaning, and to light.

Heretofore numerous attempts have been made to improve the dyeability of polyolefins such as polypropylene, e.g., by dispersing in the polymer one or more metals having a valence of at least 2, generally in the form of an organic salt of high molecular weight, or by copolymerizing the olefin (e.g., propylene) with a monomer that will render the resulting copolymer more reactive towards the dyestuffs, or, finally, by extruding and spinning a mixture of the polyolefin with a substance having basic characteristics.

We have now surprisingly found a new class of triazine dyestuffs which are particularly suitable for dyeing modified polypropylene fibers, even though such triazine dyestuffs do not possess hydrosolubilizing groups (such as, e.g., —SO$_3$H and —COOH). This class of triazine dyestuffs contains the radical (A)

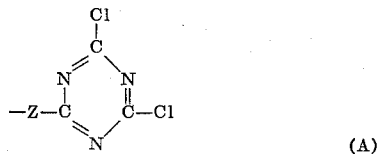

(A)

wherein Z represents =NH, —S— or —O—, or NR' wherein R' is an alkyl group having up to 7 carbon atoms.

The present invention is therefore directed to a new class of triazine dyestuffs, suitable for the dyeing of modified polypropylene, and defined by the general Formula 1:

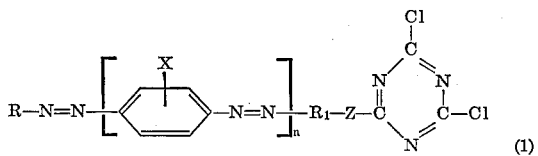

(1)

wherein R and R$_1$, whether the same or different, represent an aromatic or heterocylic radical, which may be substituted with alkyl or alkoxy groups (containing from about 1 to 18 carbon atoms), —NO$_2$, —OH, —SO$_2$R', —COR' (wherein R' is alkyl), —CONR"R''', or —SO$_2$NR"R''' (wherein R" and R''' are H or alkyl); Z may be >NH, —S—, —O—, or NR' wherein R' is alkyl having up to 7 carbon atoms; n is zero when R is a heterocyclic group, and when R is an aromatic radical n is either zero or 1; X is H, alkyl or an alkoxy group containing from about 1 to 18 carbon atoms, NO$_2$, SO$_2$R$_2$, COR$_2$, CONR$_2$R'$_2$ or SO$_2$NR$_2$R'$_2$, wherein R$_2$ and R'$_2$ are alkyl.

The heterocyclic radical (R) preferably has the following structure:

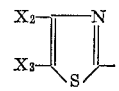

wherein X$_2$ and X$_3$, whether the same or different, can be H, —NO$_2$, alkyl or alkoxyl containing from about 1 to 18 carbon atoms, or X$_2$ and X$_3$ taken together form a benzene ring which may be substituted with alkyl or alkoxy (containing from about 1 to 18 carbon atoms), —NO$_2$, —SO$_2$R', —COR', CONR"R''' and SO$_2$NR"R''' (with R', R" and R''' having the values previously defined).

The modified polypropylene fiber is prepared by extruding a mixture of polypropylene and a modifying substance of basic nature.

The amount of basic additive present in the polypropylene fiber is desirably from about 0.05 to 5% by weight, and preferably is from about 0.5 to 1%.

The basic additive consists essentially of an organic compound containing one or more tertiary nitrogen atoms, and may also contain one or more secondary nitrogen atoms. Such additive may also contain —OH groups and can occasionally be present in the fiber in cross-linked form, e.g., in the epoxide form, which improves its stability and the uniformity of its distribution in the structure of the polyolefin filament (U.S. application Ser. No. 30,732 filed May 23, 1960, now abandoned; U.S. application Ser. No. 124,346 filed July 17, 1961, now abandoned; U.S. application Ser. No. 212,119 filed July 24, 1962, now abandoned; U.S. application Ser. No. 282,167 filed May 21, 1963, now abandoned; U.S. application Ser. No. 23,129 filed Apr. 19, 1960, now abandoned; U.S. application Ser. No. 401,670 filed Oct. 5, 1964, now abandoned; and U.S. application Ser. No. 201,818 filed June 12, 1962, now U.S. Pat. 3,281,203).

The present invention further provides a process for dyeing polypropylene material (to which basic organic substances as indicated above have been added) with a triazine dyestuff of the general Formula 1.

By the process of this invention intense dyeings are obtained, characterized by high fastness, particularly to wet treatments, such as washing with soap, drycleaning, e.g., with trichloroethylene and perchloroethylene, and by good resistance to sublimation.

The dyeing is generally carried out in an aqueous bath, at normal pressure, at temperatures of from about 95–100° C., for a period of from about 30 to 90 minutes. To the dyeing bath there can be added, if desired, conventional dispersing agents and/or alkali.

The dyestuffs of the general Formula 1 may also be applied to the modified polypropylene fiber from a bath containing from about 0.1 to 5% of an organic or inorganic acid, such as, e.g., formic acid, acetic acid, sulfuric acid, hydrochloric acid, or the like.

According to another embodiment of the dyeing process, the dyestuffs can be applied under pressure, (17–

40 p.s.i.) at from 105 to 130° C. (preferably at from about 110–125° C.), for a period of time of from about 30 to 90 minutes.

Another variation in the above described dyeing process comprises applying the dyestuff by means of impregnation by padding in the presence of auxiliaries and followed by developing for a few minutes at 120° C.

If desired, the dyeing can be carried out in the presence of auxiliaries capable of giving stability to the dispersion and such as to exert no delaying action on the exhaustion of the bath.

In the padding bath application of these dyestuffs, the impregnation is carried out at the temperature of 20–70° C., in the presence of auxiliaries such as a thickening agent of the type of sodium alginates and of dispersing agents such as the condensation product of oleic alcohol with 18 mols of ethylene oxide.

The dyed or printed materials are then preferably soaped at the boiling temperature for about 30 minutes.

The following examples are illustrative of the present invention, but are not to be construed as limitative either as regards the dyestuffs specifically employed, their methods of preparation, or their application in dyeing, for it is evident that variations and modifications may be made without departing from the spirit and nature of this invention.

All parts and percentages, except when otherwise indicated, are by weight.

EXAMPLE 1

A solution consisting of 18.5 g. of cyanuric chloride and 70 ml. of dioxane is charged into 130 ml. of $H_2O$, cooled to about 0° C. There is then added over a ten minute period 22.5 g. of 4-amino-2′,3-dimethylazobenzene dissolved in 70 ml. of dioxane, while maintaining the temperature at 0–5° C.

Immediately thereafter 8.4 g. of $NaHCO_3$ are charged in about 15 minutes. The resulting orange suspension is maintained under stirring at 0–5° C. for about 1 hour, then filtered and washed with $H_2O$ until the chloride ions have been eliminated.

The product left on the filter is taken up with 150 ml. of dioxane, filtered and dried under vacuum.

A product in the form of a yellow powder is obtained, having the formula

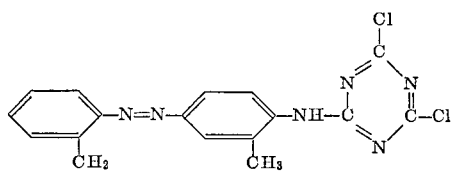

This product dyes modified polypropylene containing as the basic substance 1% of the polycondensate of dicyclohexylhexamethylendiamine, epichlorohydrin and piperazine (the modified polypropylene was prepared as described in U.S. application Ser. No. 124,346 filed July 17, 1961, now abandoned) an intense yellow shade characterized by high general fastness, particularly to sublimation and to trichloroethylene.

EXAMPLE 2

6.05 g. of 4′-nitro-4-amino-azobenzene, 4.6 g. of cyanuric chloride and 90 ml. of dioxane are reacted by heating to 80° C. and adding, at this temperature, 1.33 g. of $Na_2CO_3$.

The heating at 80° C. is continued for 1 hour and 30 minutes. Then the solution is cooled to 18–25° C. and filtered. The filtered liquid is charged into 300 ml. of $H_2O$ containing 50–60 g. of ice (so as to obtain a temperature lower than 10° C.). The dyestuff precipitates in the form of an orange yellow mass. It is filtered and washed with $H_2O$ and then dried under vacuum at a low temperature (30–40° C.).

A product in the form of a dark brown powder is obtained, having the formula

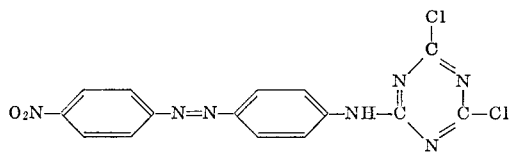

This product dyes polypropylene containing 0.5% of the basic substance of Example 1 to a very intense and brilliant yellow shade characterized by excellent general fastnesses, particularly to sublimation and to trichloroethylene.

When dyeing with the dyestuff of this example modified polypropylene containing 1% of basic substance, analogous results are obtained.

EXAMPLE 3

By operating as described in Example 1, but using amino-azo-benzene rather than 4-amino-2′,3-dimethylazobenzene, a yellow powder is obtained having the structure

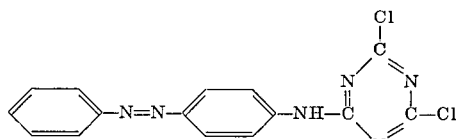

This product dyes modified polypropylene containing 1% of the basic substance of Example 1 to a yellow shade (less reddish than that obtained with the dyestuff of Example 1), characterized by good general fastness, particularly to sublimation and to trichloroethylene.

EXAMPLE 4

50 ml. of $H_2O$ and 2 g. of the condensation product of one mole of oleyl alcohol with 18 moles of ethylene oxide (having the structural formula $$C_{17}H_{33}O(CH_2—CH_2O)_{17}CH_2CH_2OH$$

molecular weight=about 1060) are charged into a 250 ml. reactor. At 0° C. a solution of 1.9 g. of cyanuric chloride in 20 ml. of dioxane is added dropwise and immediately thereafter, always at 0° C., there is introduced a dispersion of 4.4 g. of dyestuff

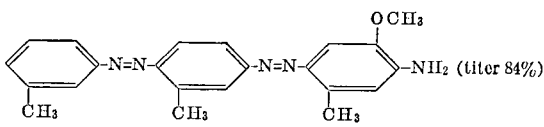

in 30 ml. of dioxane.

Then 0.85 g. of $NaHCO_3$ are added. The whole is maintained under stirring for two hours at 0–5° C., then filtered, washed with $H_2O$, and subsequently with ethyl alcohol.

After drying on a filter a brown orange powder is obtained, having the structure

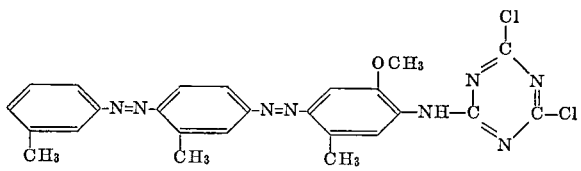

This product dyes modified polypropylene containing 0.5% of the basic substance of Example 1 to an orange shade characterized by excellent general fastness.

EXAMPLE 5

70 mol of $H_2O$ and 5–6 drops of a 30% solution of the condensation product of 1 mole of oleyl alcohol with 18 moles of ethylene oxide, are charged into a 250-ml. reactor.

At about 0° C. a solution of 9.22 g. of cyanuric chloride in 30 ml. of dioxane is added dropwise and, immediately thereafter, a solution of 5.5 g. of m-amino-phenol in 30 ml. of dioxane is introduced at a temperature of 0–5° C. Then a solution of 2.65 g. of $Na_2CO_3$ in 15 ml. of $H_2O$ is added. The whole is maintained under stirring at 0° C. for 40 minutes and then filtered, washed with cold $H_2O$, and dried on the filter. A greyish-white crystaline product is obtained, having the formula

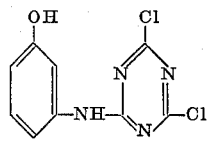

(See Example 9.)

EXAMPLE 6

70 mol of $H_2O$ and 5–6 drops of a solution of the condensation product of 1 mole of oleyl alcohol with 18 moles of ethylene oxide, are charged into a 250-ml. reactor.

At about 0° C. a solution of 9.22 g. of cyanuric chloride in 30 ml. of dioxane is added dropwise and, immediately thereafter, a solution of 8.27 g. of 2-amino-4-tert.butylphenol in 40 ml. of dioxane is introduced at a temperature of 0–5° C. Then a solution of 2.65 g. of $Na_2CO_3$ in 15 ml. of $H_2O$ is added. The whole is maintained under stirring for 40 minutes at 0° C., then filtered, washed with cold $H_2O$, and dried on the filter.

A greyish-white crystalline product is obtained, having the structure

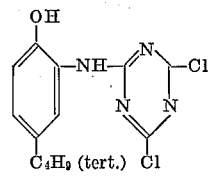

(See Examples 8 and 11.)

EXAMPLE 7

70 ml. of $H_2O$ and 5–6 drops of a solution of the condensation product of one mole of oleyl alcohol with 18 moles of ethylene oxide, having a concentration of 30%, are charged into a 250-ml. reactor.

At 0° C. a solution of 7.37 g. of cyanuric chloride in 30 ml. of dioxane is added dropwise and, immediately thereafter, a solution of 6.4 g. of 8-amino-2-naphthol in 40 ml. of dioxane is introduced. Then a solution of 2.12 g. of $Na_2CO_3$ in 12 ml. of $H_2O$ is added. The whole is maintained under stirring for 40 minutes at 0° C., filtered, washed with cold $H_2O$, and then dried on the filter.

A product in the form of a light grey powder is obtained having the structure

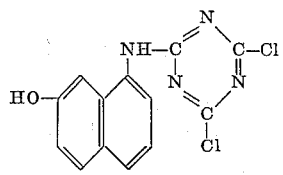

(See Examples 10, 12 and 13.)

EXAMPLE 8

5.6 g. of amino-azo-toluene hydrochloride (titer 93%), 100 ml. of $H_2O$, 2 g. of a 30% solution of the condensation product of 1 mole of oleyl alcohol with 18 moles of ethylene oxide and 10 ml. of HCl are charged into a 400-ml. beaker.

The whole is maintained under stirring for 2–3 hours, then cooled to 8–10° C. 23 ml. of a 1 N $NaNO_2$ solution are added in 30–40 minutes, keeping the temperature at 8–10° C.

The whole is stirred for 1 hour at the same temperature, then a 10% solution of sulfamic acid ($NH_2$—$SO_3H$) is added so as to destroy the $NaNO_2$ excess. Filtering is carried out using an absorbing product (Hyflo, Supercell or carboraffine) so as to accelerate the filtration.

The filtration product containing the diazo compound thus prepared, is poured, in 10 minutes, into a 600-ml. beaker provided with stirrer and thermometer, into which there has previously been introduced 3 g. of the compound

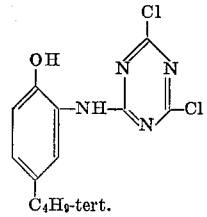

80 ml. of ethyl alcohol and 5 g. of $NaHCO_3$.

After cooling to −5° C. (external cooling with ice/salt) the diazo compound is added in 10 minutes. Then a NaOH solution (15–20 ml.), having a concentration of 3%, is added until a pH of 8–9 is reached. The whole is maintained under stirring for 8–10 minutes at −5° C. (then it is neutralized with 15–20 ml. of HCl having a concentration of 35%) until a pH of 5–6 is reached, and then filtered. It is washed with $H_2O$ and dried on a filter.

A dyestuff is obtained in the form of a dark brown powder and having the formula

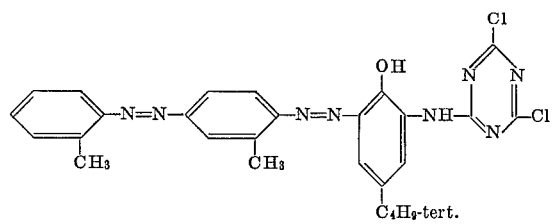

This product dyes modified polypropylene containing 0.5% of the basic substance of Example 1 to a banana yellow shade characterized by excellent fastness to trichloroethylene and to sublimation.

EXAMPLE 9

5.6 g. of amino-azo-toluene chlorohydrate (titer 93%), 100 ml. of $H_2O$, 2 g. of a 30% solution of the condensation product of 1 mole of oleyl alcohol with 18 moles of ethylene oxide and 10 ml. of HCl are charged into a 400-ml. beaker.

The whole is left under stirring for 2–3 hours and cooled to 8–10° C., then 23 ml. of a 1 N $NaNO_2$ solution are added in 30–40 minutes, keeping the temperature at 8–10° C. The solution is stirred for 1 hour at the same temperature, then sulphamic acid solution (10% concentration) is added so as to destroy the $NaNO_2$ excess. Filtration is carried out using an absorbing product (Hyflo, Supercell or carboraffine) in order to accelerate the filtration.

The filtrate containing the thus prepared diazon compound is poured, in 10 minutes, into a 600 ml. beaker provided with a stirrer and a thermometer, into which there previously had been added 2.9 g. of the compound

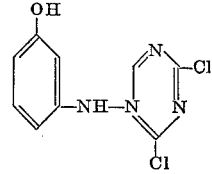

(prepared as described in Example 5)

80 ml. of ethyl alcohol and 5 g. of $NaHCO_3$.

7

After cooling to −5° C. (external cooling with ice/salt) the diazo compound is added in 10 minutes. Then an NaOH solution (15–20 ml.) having a concentration of 3% is added until a pH of 8–9 is reached. The whole is maintained under stirring for 8–10 minutes at −5° C. (then it is neutralized with 15–20 ml. of HCl, having a concentration of 35%) until a pH of 5–6 is reached and is then filtered. After washing with $H_2O$ it is dried on the filter.

A brown powder is obtained having the formula

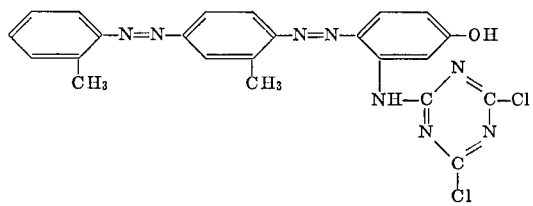

This product dyes modified polypropylene containing 0.5% of the basic substance of Example 1 in a yellow shade having excellent general fastness, particularly to sublimation and to trichloroethylene.

The same dyestuff also dyes modified polypropylene containing 1% of basic substance with analogous results.

EXAMPLE 10

5.6 g. of 4-amino-2′-3-dimethyl-azo-benzene (titer 93%), 100 ml. of $H_2O$, 2 g. of a 30% solution of the condensation product of 1 mole of oleyl alcohol with 18 moles of ethylene oxide, and 10 ml. of HCl are charged into a 400-ml. beaker.

The solution is left under stirring for 2–3 hours, then it is cooled to 8–10° C. and 23 ml. of a 1 N $NaNO_2$ solution are added in 30–40 minutes, while keeping the reaction mass at a temperature of 8–10° C. The mass is stirred for 1 hour at the same temperature. Sulfamic acid (concentration of the solution 10%) is added so as to destroy the $NaNO_2$ excess, and then it is filtered using an absorbing product (Hyflo, Supercell or carboraffine) in order to accelerate the filtration.

The filtrate containing the thus prepared diazo compound is poured, in 10 minutes, into a 1-liter beaker provided with a stirrer and a thermometer, into which there previously has been added 6.14 g. of the compound

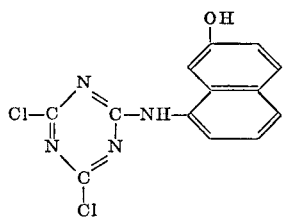

120 ml. of acetone, and 15 g. of sodium acetate (these materials having been brought to about 0° C.). After 1 hour's stirring at 0° C. it is filtered, washed with cold $H_2O$ and dried on the filter. A dyestuff is obtained in the form of a dark red powder of the formula

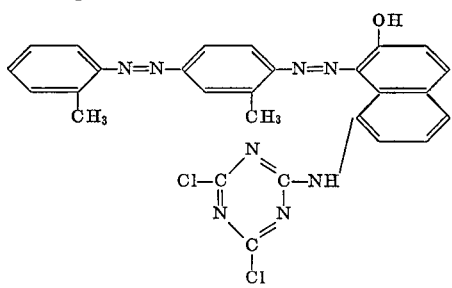

This product dyes modified polypropylene containing 0.5% of the basic substance of Example 1 to a violet shade characterized by excellent fastness to trichloroethylene and to sublimation.

8

EXAMPLE 11

1.6 g. of 2-amino-benzothiazole, 30 ml. of acetic acid, and 3 ml. of $H_2O$ are charged into a 250-ml. reactor. The mass is cooled at 0° C., then 11.5 ml. of a 1 N solution of nitrosylsulfuric acid are dropwise added in 30 minutes at 0–5° C. The mass is maintained under stirring for 1 hour at 0–5° C., then 0.5 g. of urea is added. The whole is charged into ice.

After 1 hour of stirring at a temperature of 8–10° C., sulfamic acid is added in order to destroy the $NaNO_2$ excess and the solution is filtered on an absorbing product (Hyflo, Supercell or carboraffine) so as to accelerate the filtration.

Separately, 3 g. of the compound

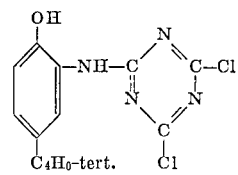

and 50 ml. of dimethylformamide are charged into a 1-liter beaker. After cooling to about −5° C. the diazo compound of 2-amino-benzothiazole and 80 g. of sodium acetate are contemporaneously added in 5 minutes so as to keep the pH at about 5. After 10–15 minutes at −5° C. the whole is filtered, washed with cold water and dried on the filter.

A brown yellow powder is obtained having the formula

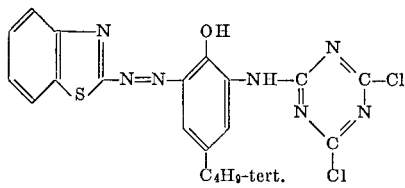

This product dyes modified polypropylene containing 0.5% of the basic substance of Example 1 in a khaki-yellow shade characterized by excellent general fastness.

When dyeing modified polypropylene containing 1% of basic substance with the dyestuff of this example analogous results are obtained.

EXAMPLE 12

3.1 g. of the compound

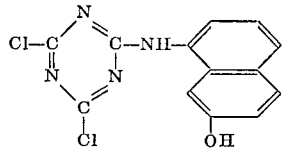

and 60 ml. of acetone are charged into a 800-ml. beaker. After cooling at −5° C. the diazo compound of 2-amino-benzothiazole, prepared according to the preceding example, and 80 g. of sodium acetate are contemporaneously added, so as to keep the pH at about 5.

After 10 minutes stirring at −5° C. the solution is filtered, washed with cold water and dried on the filter.

A dark red powder is obtained having the formula

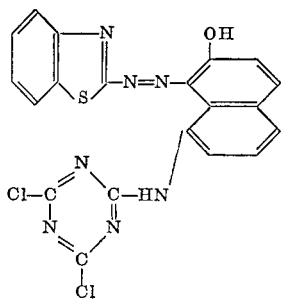

This product dyes modified polypropylene containing 1% of the basic substance of Example 1 to a violet pink shade with good general fastness.

EXAMPLE 13

3.1 g. of the compound

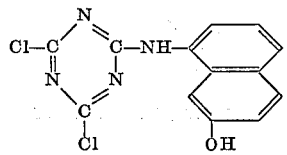

and 60 ml. of acetone are charged into a 800-ml. beaker. After cooling at about —5° C. the diazo compound of 2-amino-6-n-butyl-benzothiazole and 80 g. of sodium acetate are contemporaneously added in order to keep the pH at about 5. After 10 minutes stirring at —5° C. the solutiton is filtered, washed with cold $H_2O$, and dried on the filter.

A dark red powder is obtained having the formula

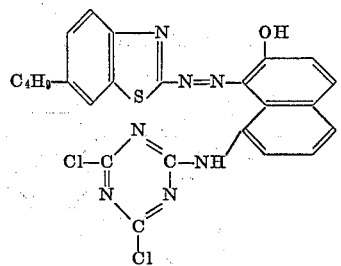

This product dyes modified polypropylene containing 1% of the basic substance of Example 1 to a violet pink shade with good general fastness.

EXAMPLE 14

A solution of 14.3 g. of 1-(3'-amino-phenyl)-3-methyl-5-pyrazolone hydrochloride (titer 39%) in 80 ml. of $H_2O$, is charged into a 600-ml. beaker. The solution is neutralized with a solution of 1.37 g. of $Na_2CO_3$ in 10 ml. of $H_2O$ (until a pH of 6-7 is reached).

A brown yellow dispersion is obtained, which is charged into a 250-ml. reactor already containing 20 ml. of $H_2O$. At about 0° C. a solution of 4.7 g. of cyanuric chloride in 20 ml. of dioxane is added dropwise thereto. Then a solution of 1.37 g. of $Na_2CO_3$ in 10 ml. of $H_2O$ is introduced at about 0° C. The whole is maintained under stirring for 30-40 minutes at about 0° C., then filtered, washed with cold $H_2O$, and dried on the filter.

A crystalline powder is obtained having a yellowish white color and of the structure

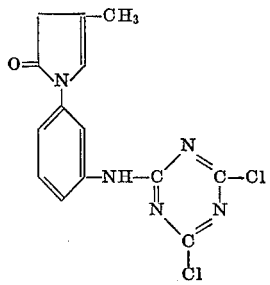

EXAMPLE 15

3.3 g. of the compound

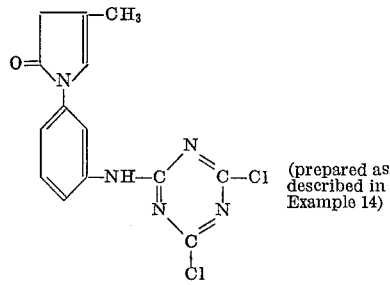

(prepared as described in Example 14)

and 60 ml. of dimethylformamide are charged into a 1-liter beaker. After cooling at —5° C. the diazo compound of 2-amino-benzothiazole, prepared according to Example 11, and 80 g. of sodium acetate are contemporaneously added until a pH of 5, is reached. After 15 minutes' stirring at —5° C. the reaction mass is filtered, washed with cold $H_2O$ and dried on the filter.

An orange powder is obtained, having the structure

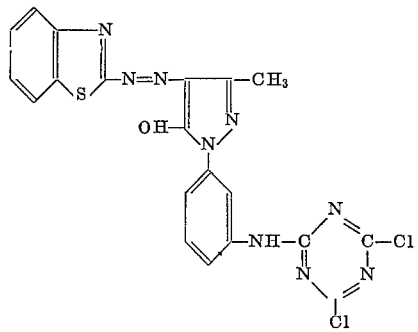

This product dyes modified polypropylene containing 0.5% of basic substance to a very intense yellow shade characterized by excellent general fastness.

Also when dyeing modified polypropylene containing 1% of the basic substance of Example 1 with the dyestuff of this example, analogous tinctorial results are obtained.

EXAMPLE 16

0.05 g. of the dyestuff prepared according to Example 1 are dissolved in 20 ml. of acetone, 1 ml. of the condensation product of 1 mole of oleyl alcohol with 18 moles of ethylene oxide is added, and at 60–70° C. the acetone is evaporated. The volume is brought to 200 ml. with distilled water and 3 g. of a modified polypropylene fabric containing 0.5% of the basic substance of Example 1 are introduced. It is boiled for 1 hour. Then it is soaped with a solution containing 5% of soap for half an hour at the boiling temperature.

A fabric dyed in a very intense yellow shade characterized by excellent general fastness is obtained.

When operating as described above with any of the other dyestuffs prepared, analogous results are obtained.

EXAMPLE 17

0.05 g. of the dyestuff prepared according to Example 4 are dissolved as described in Example 16. 2 ml. of acetic acid having a concentration of 5% are added to the dispersion. 3 g. of a fabric of modified polypropylene containing 0.5% of the basic substance of Example 1 are introduced. It is heated to boiling temperature for half an hour.

6 ml. of a $Na_2CO_3$ solution having a concentration of 10% are added and the dyeing is continued at boiling temperature for 1 hour.

The soaping is carried out as described in Example 16.

There results a fabric dyed to an intense orange shade characterized by very good general fastness.

When operating as indicated in this example, but dyeing a fabric of polypropylene containing 1% of basic substance, a fabric dyed with equivalent characteristics is obtained.

EXAMPLE 18

When operating as described in Examples 16 and 17, but charging the dyestuff in an already dispersible form (a fine dyeing powder consisting of dyestuff and suitable additives), results are obtained that are analogous to those obtained in Examples 16 and 17.

Having thus described our invention, what we desire to secure and claim by Letters Patent is:

1. Disperse triazine dyestuffs of the formula

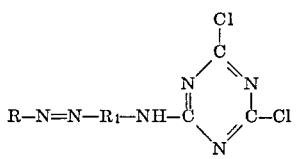

wherein R and $R_1$ are each selected from the group consisting of aromatic, heterocyclic, substituted aromatic, and substituted heterocyclic rings, at least one of R and $R_1$ being a heterocyclic or substituted heterocyclic ring, said aromatic rings being selected from the group consisting of phenyl and naphthyl, said heterocyclic rings being selected from the group consisting of thiazolyl, benzthiazolyl, pyrazolyl and phenylpyrazolyl, said substituents being selected from the group consisting of alkyl, alkoxy, $-NO_2$, $-OH$, $-SO_2R'$, $-COR'$, or $-CONR''R'''$, wherein $R'$ is alkyl and $R''$ and $R'''$ are H or alkyl, said alkyl and alkoxy radicals having from 1–4 carbon atoms; said R and $R_1$ being directly bonded to said $-N=N-$ and said $R_1$ being directly bonded to said $-NH-$ through a carbon of said aromatic or heterocyclic ring.

2. The dyestuff of claim 1 wherein R has the structure

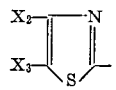

wherein $X_2$ and $X_3$ are selected from the group consisting of H, methyl, and methoxy, or $X_2$ and $X_3$ taken together form a benzene ring or a substituted benzene ring wherein the substituent is alkyl containing from 1 to 4 carbon atoms.

3. The dyestuff having the structure

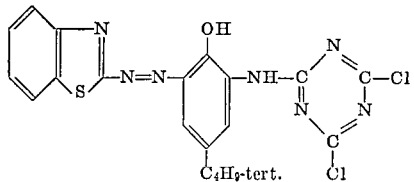

4. The dyestuff having the structure

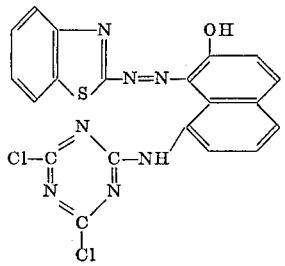

5. The dyestuff having the structure

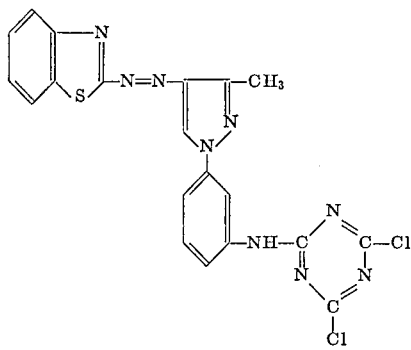

6. The dyestuff having the structure

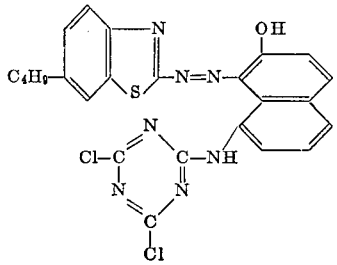

References Cited

UNITED STATES PATENTS

| | | | |
|---|---|---|---|
| 2,860,128 | 11/1958 | Gunst | 260—153 |
| 3,038,893 | 6/1962 | Andrew | 260—153 |
| 3,177,214 | 4/1965 | Sulzer et al. | 260—153 X |

FOREIGN PATENTS

| | | |
|---|---|---|
| 864,227 | 3/1961 | Great Britain. |
| 584,715 | 11/1958 | Italy. |
| 159,906 | 4/1964 | Russia. |

CHARLES B. PARKER, Primary Examiner

D. M. PAPUGA, Assistant Examiner

U.S. Cl. X.R.

8—41, 55; 260—158, 174, 191, 205, 249.5

PO-1050
(5/69)

UNITED STATES PATENT OFFICE
CERTIFICATE OF CORRECTION

Patent No. 3,527,746            Dated September 8, 1970

Inventor(s) Luigi Canonica, Argento Crotti and Fabrizio Merlo

It is certified that error appears in the above-identified patent and that said Letters Patent are hereby corrected as shown below:

Column 3, the structural formula in Example 1

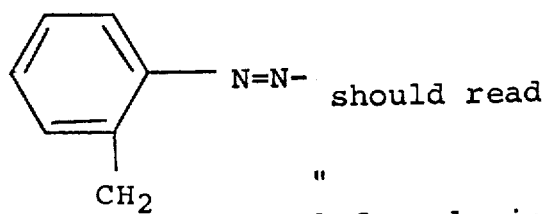   should read   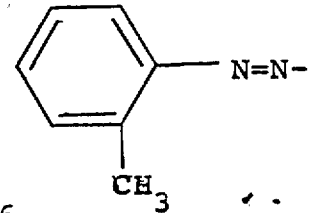

Column 5, the structural formula in Example 6

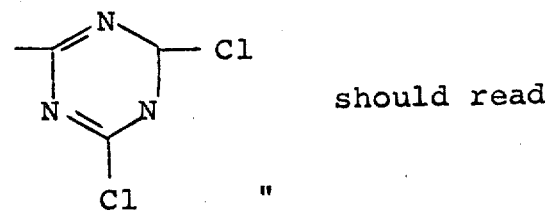   should read   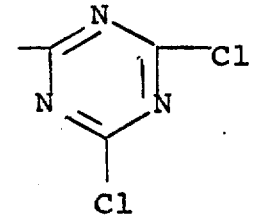

Column 6, line 61, "diazon" should read -- diazo --. Column 8, the first structural formula in Example 11

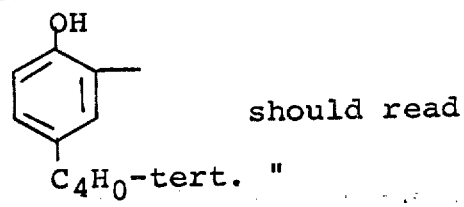   should read   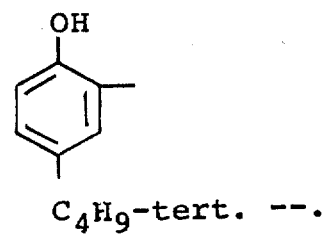

Column 10, the first structural formula in Example 15,

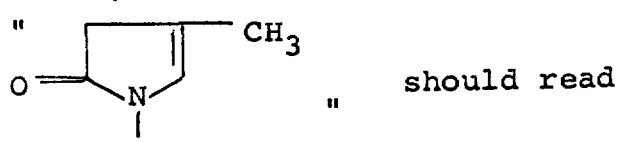   should read   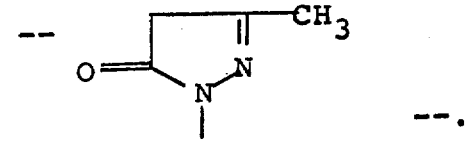

Column 10, line 21, "minutes'" should read -- minutes --.

Signed and sealed this 14th day of December 1971.

(SEAL)
Attest:

EDWARD M. FLETCHER, JR.
Attesting Officer

ROBERT GOTTSCHALK
Acting Commissioner of Patents